United States Patent
Liu et al.

(10) Patent No.: US 10,823,678 B2
(45) Date of Patent: Nov. 3, 2020

(54) RAMAN SPECTRUM DETECTION APPARATUS AND METHOD BASED ON POWER OF REFLECTED LIGHT

(71) Applicant: NUCTECH COMPANY LIMITED, Beijing (CN)

(72) Inventors: Haihui Liu, Beijing (CN); Hongqiu Wang, Beijing (CN); Jianhong Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/229,589

(22) Filed: Dec. 21, 2018

(65) Prior Publication Data

US 2019/0195804 A1 Jun. 27, 2019

(30) Foreign Application Priority Data

Dec. 26, 2017 (CN) .......................... 201711442674.7

(51) Int. Cl.
*G01J 3/44* (2006.01)
*G01N 21/65* (2006.01)
*G01J 3/02* (2006.01)
*G01N 21/27* (2006.01)

(52) U.S. Cl.
CPC ............ *G01N 21/658* (2013.01); *G01J 3/027* (2013.01); *G01J 3/44* (2013.01); *G01J 3/4412* (2013.01); *G01N 21/27* (2013.01); *G01N 21/65* (2013.01); *G01J 2003/4418* (2013.01)

(58) Field of Classification Search
CPC ...... G01N 21/658; G01N 21/65; G01N 21/27; G01J 3/027; G01J 3/44; G01J 3/4412; G01J 2003/4418
See application file for complete search history.

(56) References Cited

U.S. PATENT DOCUMENTS

| 2012/0274934 A1* | 11/2012 | Messerschmidt ...... G01N 21/65 356/301 |
| 2017/0184453 A1* | 6/2017 | Wang .................... G01J 3/2803 |
| 2018/0180551 A1 | 6/2018 | Zhang et al. |

FOREIGN PATENT DOCUMENTS

| CN | 106770176 A | 5/2017 |
| WO | WO 2014/008359 A1 | 1/2014 |

OTHER PUBLICATIONS

Extended European Search Report as issued in European Patent Application No. 18215533.3, dated May 22, 2019.

* cited by examiner

*Primary Examiner* — Abdullahi Nur
(74) *Attorney, Agent, or Firm* — Pillsbury Winthrop Shaw Pittman LLP (57) ABSTRACT

A detection apparatus includes: a laser configured to emit laser light towards an object to be detected; a Raman spectrometer configured to receive a Raman light signal from the object; a light sensor configured to receive portions of the laser light reflected and scattered by the object under irradiation of the laser light, and to determine power of the received portions of the laser light; and a controller configured to control an operation of the detection apparatus based on the power determined by the light sensor. Further, there is provided a detection method using the above detection apparatus.

19 Claims, 3 Drawing Sheets

RAMAN SPECTRUM DETECTION APPARATUS AND METHOD BASED ON POWER OF REFLECTED LIGHT

This application claims the priority benefit of the Chinese Patent Application No. 201711442674.7 filed on Dec. 26, 2017, the whole disclosure of which is incorporated herein by reference.

TECHNICAL FIELD

Embodiments of the present disclosure generally relate to a detection apparatus and a detection method, and particularly, to Raman spectrum detection apparatus and method based on the power of reflected light.

DESCRIPTION OF RELATED ART

Raman spectrum analysis technology is a non-contact spectrum analysis technology based on Raman scattering effect, which can qualitatively and quantitatively analyze the composition of a substance. The Raman spectrum is a molecular vibration spectrum that can represent the fingerprint characteristics of molecules, and can be used for the inspection of a substance. A Raman spectrometer can inspect and identify the substance by the Raman spectrum generated by the Raman scattering effect of the object to be inspected with respect to exciting light.

In recent years, Raman spectrum analysis technology has been used in the fields of dangerous goods inspection and substance identification. In the field of substance identification, because the colors and shapes of various substances are different from one another, it is usually hard for a person to accurately determine the properties of the substance, and a Raman spectrum is determined by the molecular energy level structure of the object to be inspected, and thus a Raman spectrum can be used as the "fingerprint" information of a substance for substance identification. Therefore, Raman spectrum analysis technology has been used in the fields of customs, public security, food & medicine, environment, etc.

SUMMARY

A laser having a high power density is generally used as an exciting light source in Raman spectrum detection, for example, near infrared laser light of about 785 nm. Near infrared laser light has a strong thermal effect. So, in case components of the object to be detected are not known, a rushed detection made by using such laser light may possibly cause the object to be detected to be burned and/or damaged by the laser light, and if the object to be detected is a flammable and/or explosive chemical, such rushed detection may lead to burning, exploding or the like, resulting in potential personal and property loss.

An object of the present disclosure is to at least partly solve or alleviate at least one aspect of the above mentioned or other disadvantages or problems in the art.

According to an aspect of the present disclosure, there is provided a detection apparatus.

According to an exemplary embodiment, the detection apparatus may include: a laser configured to emit laser light towards an object to be detected; a Raman spectrometer configured to receive a Raman light signal from the object; a light sensor configured to receive portions of the laser light reflected and scattered by the object under irradiation of the laser light, and to determine power of the received portions of the laser light; and a controller configured to control an operation of the detection apparatus based on the power determined by the light sensor.

According to an exemplary embodiment, the controller may be further configured to: compare the power determined by the light sensor with a threshold power; instruct the laser to emit the laser light for detection in response to the power being greater than or equal to the threshold power; and instruct the detection apparatus to terminate the detection in response to the power being smaller than the threshold power.

According to an exemplary embodiment, the detection apparatus may further comprise an alarm device, and the controller is further configured to instruct the alarm device to send an alarm signal while or after instructing the detection apparatus to terminate the detection.

According to an exemplary embodiment, the detection apparatus may further comprise a fixing device configured to position the object such that a surface to be detected of the object is perpendicular to a direction along which the laser light impinges onto the surface.

According to an exemplary embodiment, the fixing device may comprise: a light aperture through which the laser light passes to impinge onto the surface to be detected of the object; and an inner positioning surface arranged perpendicular to a direction along which the laser light passes through the light aperture, wherein the surface to be detected of the object is arranged to closely abut against the inner positioning surface.

According to an exemplary embodiment, the detection apparatus may further comprise a first beam splitter disposed in a Raman light path between the object and the Raman spectrometer, the first beam splitter configured to guide the laser light emitted from the laser to the object, to transmit therethrough Raman light from the object to the Raman spectrometer, and to have a predefined transmittance to laser light, emitted by the laser, having a predetermined wavelength.

According to an exemplary embodiment, the detection apparatus may further comprise a second beam splitter disposed in the Raman light path from the object to the Raman spectrometer, the second beam splitter configured to reflect reflected laser light and scattered laser light from the object, to transmit therethrough the Raman light from the object to the Raman spectrometer, and to reflect a part, which is transmitted through the first beam splitter, of the laser light having the predetermined wavelength, to the light sensor.

According to an exemplary embodiment, the detection apparatus may further comprise at least one of following optical members: a first optical filter disposed in the Raman light path at a position downstream of the first beam splitter and the second beam splitter, and configured to filter Rayleigh light of a light signal; or a second optical filter disposed between the laser and the first beam splitter and configured to limit the laser light emitted by the laser within a desired wavelength band.

According to an exemplary embodiment, the detection apparatus may further comprise at least one of following optical members: a first convergent lens or lens set disposed between the second beam splitter and the object; a second convergent lens or lens set disposed between an imaging device and the second beam splitter; or a third convergent lens or lens set disposed between the Raman spectrometer and the first beam splitter.

According to an exemplary embodiment, the predefined transmittance of the first beam splitter to laser light impinging at an incident angle of 45 degrees is selected from within 5% to 30%.

According to an aspect of the present disclosure, there is provided a detection method using the detection apparatus described in any of embodiments of the present disclosure.

In an exemplary embodiment, the method may include: emitting, to the object to be detected, a laser light pulse for pre-detection; receiving reflected laser light and scattered laser light coming from the object and generated under the laser light pulse; determining the power of the reflected and scattered laser light; comparing the determined power to a threshold power; performing a normal detection if the determined power is greater than or equal to the threshold power; and terminating the detection if the determined power is smaller than the threshold power.

According to an exemplary embodiment, the method may further comprise sending an alarm signal while or after terminating the detection.

In an exemplary embodiment, the method may include: emitting, to the object to be detected, a laser light pulse for detection; determining the power of the laser light reflected and scattered by the object; comparing the determined power to the threshold power; continuing the detection if the determined power is greater than or equal to a threshold power; and terminating the detection if the determined power is smaller than the threshold power.

According to another exemplary embodiment, the method may further comprise sending an alarm signal while or after terminating the detection.

BRIEF DESCRIPTION OF THE DRAWINGS

Exemplary embodiments of the present disclosure will be described as examples with reference to the accompanying drawings, in which.

DETAILED DESCRIPTION OF EXEMPLARY EMBODIMENTS

Exemplary embodiments of the present disclosure will be described hereinafter in detail with reference to the attached drawings. Throughout the description, like reference numerals refer to like elements or features. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general inventive concept of the present disclosure, there is provided a detection apparatus, comprising: a laser configured to emit laser light towards an object to be detected; a Raman spectrometer configured to receive a Raman light signal from the object; a light sensor configured to receive portions of the laser light reflected and scattered by the object under irradiation of the laser light, and to determine power of the received portions of the laser light; and a controller configured to control an operation of the detection apparatus based on the power determined by the light sensor.

Figure 1:
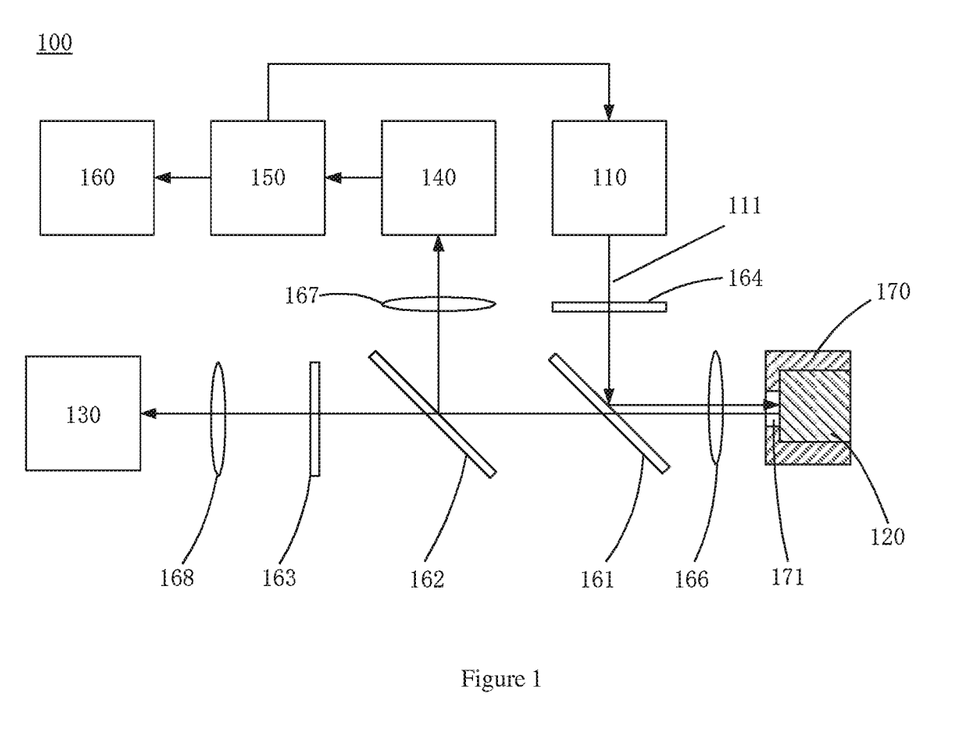
FIG. 1 is a block diagram schematically showing a detection apparatus according to an embodiment of the present disclosure.

FIG. 1 is a schematic diagram of a detection apparatus according to an embodiment of the present disclosure. As shown in FIG. 1, in this embodiment, a detection apparatus 100 comprises: a laser 110 configured to emit laser light 111 towards an object 120 to be detected; a Raman spectrometer 130 configured to receive a Raman light signal 112 from the object 120; a light sensor 140 configured to receive portions of the laser light reflected and backward Rayleigh-scattered by the object 120 under irradiation of the laser light, and to determine power of the received portions of the laser light; and a controller 150 configured to control an operation of the detection apparatus 100 based on the power determined by the light sensor 140.

As understood by those skilled in the art, a white or light-colored object has a high reflectivity of light, while a black or dark colored object has a high absorptivity of light. Thus, if a black or dark colored object is detected using laser light, the object may rapidly increase in temperature due to absorbing significant energy from the laser light, and thereby may be partially ablated. On the other hand, a white or light colored object has a higher reflectivity to laser light. Thus a general inventive concept of the present disclosure is characterized in that a color shade of a detected object is determined by detecting or determining power of laser light reflected and Rayleigh scattered by the object, and then a detection operation of a detection apparatus is controlled based on the determined color shade of the object.

In the present disclosure, the light sensor 140 may include any appropriate photoelectric conversion element, for example, including but not limited to: a photodiode, a phototriode, a photo-resistor or the like. In an exemplary embodiment of the present disclosure, the light sensor 140 includes a photodiode. Photodiode is a photosensitive photoelectric element, in which a reverse current will be generated and increase as the power of light received by the photosensitive photoelectric element increases, thus the specific value of the power of the light received by the photoelectric element may be determined based on a specific value of the reverse current of the photoelectric element. Similarly, if the light sensor 140 includes a photo-resistor, the power of light received by the photo-resistor may also be determined through reverse derivation based on a change in resistance of the photo-resistor.

Based on the techniques of the present disclosure, it will be understood by those skilled in the art that if the detected object 120 is a white or light colored object, it will reflect and scatter more laser light, thus the power of the laser light coming from the object 120 and received by the light sensor 140 will be greater. Thus, a threshold power 6 may be preset, so that if it is determined that the power I of the light received by the light sensor 140 is greater than or equal to the threshold power $I_{th}$, it can be determined that the detected object is a white or light colored object, otherwise it may be determined that the detected object is a black or dark colored object. Similarly, a threshold power $I_{th}$ may be preset, so that if it is determined that the power I of the light received by the light sensor 140 is less than or equal to the threshold power $I_{th}$, it can be determined that the detected object is a black or dark colored object, otherwise it may be determined that the detected object is a white or light colored object.

Calculation of the power I of the light received by the light sensor 140 may be implemented by software or algorithm pre-stored in a storage of a field operated-computer, of a computer in a remote control center or of the controller 150, or by various specific devices or circuits. For example, if a photodiode is utilized, a reverse current of the photodiode may be measured such that the power of light received by the photodiode may be determined. These concepts are readily comprehensible to those skilled in the art and will not be described in detail herein. In addition, a specific value of the threshold power $I_{th}$ may be set according to specific conditions such as technical parameters of the detection apparatus, the detection environment or the like.

In an embodiment, the controller 150 may be configured to compare the power I determined by the light sensor 140 with the threshold power $I_{th}$, such that: if the power I of the received light is greater than or equal to the threshold power $I_{th}$ (that is, $I \geq I_{th}$), it may be determined that the currently detected object 120 is a white or light color object and a laser light detection may be performed, then the controller instructs the laser 110 to emit laser light for detection and otherwise the controller does not instruct the laser 110 to emit laser light for detection or terminates the detection; or if the power I of the received light is smaller than the threshold power $I_{th}$ (that, $I < I_{th}$), it may be determined that the currently detected object 120 is a black or dark colored object, and has a higher absorptivity of energy from the laser light and thus faces a risk of being ablated, thus the controller may instruct the detection apparatus to terminate the detection and otherwise the controller instructs the laser 110 to emit laser light for detection.

It is noted that the color shade of the detected object 120 may be pre-judged before a normal detection or may be judged during the normal detection. The details will be described as below.

In an embodiment, after starting of a detection procedure and before a normal detection using laser light, the laser 110 may firstly emit, towards the object 120 placed at a position to be detected, a laser light pulse (for example, a laser light pulse with a duration of 5 milliseconds) for pre-detection, the light sensor 140 receives reflected light from the object 120 due to irradiation of the pulse laser light and determines power I of the light received by the light sensor 140 so as to judge whether the power I is greater than, equal to or smaller than the threshold power $I_{th}$. Based on a relationship between the power I and the threshold power $I_{th}$, the controller 150 determines whether or not it is suitable to perform a normal laser light detection on the current object to be detected. For example, the controller 150 may be configured to: if the power I is greater than or equal to the threshold power $I_{th}$, determine that it is suitable to perform a normal laser light detection on the object; and if the power I is smaller than the threshold power $I_{th}$, determine that it is not suitable to perform a normal laser light detection on the object. If the controller 150 judges that it is suitable to perform a normal laser light detection on the current object to be detected, the controller 150 may instruct the laser 110 to start emitting a continuous laser light beam for detection of the object 120. If the controller 150 judges that it is not suitable to perform a laser light detection on the current object to be detected, the controller 150 may directly terminate the detection procedure, without requiring the laser 110 to emit any continuous laser light beam for the normal detection.

In an embodiment, after starting of the detection procedure, the laser 110 may directly emit, towards the object 120 placed at a position to be detected, a continuous laser light beam for detection, and at the same time, the light sensor 140 receives reflected light and scattered light from the object 120 due to irradiation of the pulse laser light and determines power I of the received light so as to judge whether the power I is greater than, equal to or smaller than the threshold power $I_{th}$. Based on a relationship between the power I and the threshold power $I_{th}$, the controller 150 determines whether or not it is suitable to perform a normal laser light detection on the current object to be detected (for example, based on a standard similar to that described above). If the controller 150 determines that it is suitable to perform a laser light detection on the object, the controller 150 instructs the laser 110 to continue emitting the laser light beam for detection of the object 120, until end of the detection. If the controller 150 judges that it is not suitable to perform a laser light detection on the current object to be detected, the controller 150 may instruct the laser 110 to stop emitting laser light and terminate the detection procedure.

According to an embodiment, the detection apparatus 100 may further comprise an alarm device 160. If the controller 150 determines the object should not be subject to a laser light detection, it may instruct, while or after terminating the detection procedure, the alarm device 160 to send an alarm signal so as to warn a nearby operator that the current object to be detected is not suited to be detected or not suitable to be continuously detected due to its darker color and/or that the detection operation has been terminated. The alarm signal may include a special acoustical signal and/or an image signal.

It is noted that a same one object (or samples having a same color shade) may be placed in various ways, thus its/their surface(s) to be detected will form different angles with respect to a direction of the detection laser light beam, which may result in different detection results of the power of the reflected and scattered light coming from the object and received by the light sensor. Similarly, as for objects having different color shades and different shapes and/or placed in different ways, it is possible that the power of the reflected and scattered light coming from the object and received by the light sensor may be the same for all the objects. In the above-described two cases, the power received by the light sensor will lack fidelity, which may result in erroneous judgment of the controller with respect to the color shade of the object, thereby possibly leading to dangerous results.

In order to avoid or eliminate as much as possible adverse influences on the power of the reflected and scattered light resulting from factors such as different shapes of objects, different arrangements or the like, in an embodiment, the detection apparatus 100 may comprise a fixing device 170 for fixing the object 120.

The fixing device 170 may be, for example, a box or clip type fixing device or other appropriate fixing device or structure for positioning a surface to be detected of the object 120 to be detected to be essentially perpendicular (e.g., exactly perpendicular or within plus or minus 5 degrees of perpendicular) to a direction of the laser light beam. For example, in the exemplary embodiment shown in FIG. 1, the fixing device 170 is a box type fixing device having an inner positioning surface essentially perpendicular to the direction of the laser light beam, wherein the surface to be detected of the object 120 closely abuts against the inner positioning surface of the fixing device 170 and thus is also positioned perpendicular to the direction of the laser light beam. The back of the object 120 may be further fixed by one or more other suitable fixing parts (not shown in FIG. 1) of the fixing device 170. A light aperture 171 may be provided in a front wall of the fixing device 170, such that the laser light beam may pass through the light aperture 171 to impinge onto the surface to be detected of the object 120 that is fixed inside of the fixing device 170. The light aperture 171 may have a shape in form of a rectangular slit, a rectangular hole or a circular hole.

In embodiments of the present disclosure, the detection apparatus 100 may comprise one or more optical devices for configuring or guiding a light path between the laser 110 and the detected object 120 (hereinafter referred to as "laser light path"), a light path between the detected object 120 and the Raman spectrometer 130 (hereinafter referred to as "Raman light path") and/or a light path between the light sensor 140 and the detected object 120 (hereinafter referred to as "detection light path").

As shown in FIG. 1, the optical devices may include a first beam splitter 161 disposed in the Raman light path and configured to guide the laser light emitted from the laser 110 to the detected object 120 and to not block or adversely affect transmission of a light signal (Raman scattering light) from the detected object 120 to the Raman spectrometer 130.

As an example, the first beam splitter 161 may be a long-wave pass dichroic mirror. A long-wave pass dichroic mirror generally allows light having a wavelength greater than a predetermined wavelength to pass therethrough and reflect light having a wavelength smaller than the predetermined wavelength. In a case where a Raman scattering effect is excited by using laser light to irradiate the detected object, most of the Raman scattering light will have a decreased frequency and increased wavelength. Thus, the long-wave pass dichroic mirror may be suitably configured such that laser light emitted from the laser 110 and having a predetermined wavelength will be reflected towards the detected object 120 and that Raman scattering light coming from the detected object 120 and having an increased wavelength will be allowed to pass through the long-wave pass dichroic mirror to be transmitted towards the Raman spectrometer 130. The specific configuration of the long-wave pass dichroic mirror may be set according the wavelength of the laser light emitted by the laser 110.

Although in above examples, the long-wave pass dichroic mirror is described as an example of the first beam splitter 161, the first beam splitter 161 of the present disclosure is not limited to only the long-wave pass dichroic mirror, and the above function may be achieved by selecting the beam splitting member by other known beam splitting arrangements.

With provision of the first beam splitter 161, the laser light path and the Raman light path may be at least partly combined, thereby facilitating reduction of the overall dimension of the detection apparatus.

Further, as shown in FIG. 1, the optical devices may further comprise a second beam splitter 162, which is also disposed in the Raman light path and further configured to reflect some of reflected light from the object and to transmit therethrough the Raman light from the object 120 such that the power of the light is detected by the light sensor 140.

It is noted that the second beam splitter 162 may be not disposed in the Raman light path, and instead, in a separate light path. However, disposing the second beam splitter in the Raman light path may enable the laser light path and the Raman light path to be at least partly combined, thereby facilitating reduction of the overall dimension of the detection apparatus. It is further noted that if the second beam splitter 162 is disposed in the Raman light path, as shown in FIG. 1, the first beam splitter 161 will transmit therethrough at least part of the laser light reflected and scattered by the object. In practice, the first beam splitter 161, which is commercially available, may be made such that it has a very high reflectivity of laser light having an incident angle of 45 degrees, for example, a reflectivity of 94%. Since there will still be 6% of laser light to be transmitted through the first beam splitter even under such high reflectivity of 94%, and the first beam splitter 161 will have a lower reflectivity of laser light having other incident angles, and further since the laser light has a large intensity, the laser light reflected and scattered by the object, even after being transmitted through the first beam splitter 161 and then being reflected by the second beam splitter 162, will still have a high intensity and thus can be distinctly detected by a detector.

In an exemplary embodiment, in order to improve utilization of the laser light from the laser 110, the first beam splitter 161 includes a highly reflective film having a high reflectivity to laser light of a predetermined wavelength and configured for reflecting most of the laser light to the object 120, and further, the first beam splitter 161 has a predefined transmittance to the laser light having the predetermined wavelength. It is noted that the specific value of the reflectivity (or transmittance) may be set as required, for example, based on the power of laser light emitted from the laser 110, light sensitivity of the light sensor 140 or the like. For example, in general, the first beam splitter 161 may be provided with, for example, a coating, such that it has a reflectivity of 70% to 95% (that is, a transmittance of 5% to 30%) to laser light impinging at an incident angle of 45 degrees.

The second beam splitter 162 may include a film or structure having a high reflectivity to laser light, such that a part of the laser light beam transmitted through the first beam splitter 161 can be sufficiently or even fully reflected towards the light sensor 140. In order to improve sensitivity and accuracy of the light sensor 140 with respect to detection of light intensity, in an exemplary embodiment, the second beam splitter 162 has a reflectivity of at least 94%, desirably a reflectivity of at least 99.5%, to laser light having a predetermined wavelength and propagating/impinging at an incident angle of 45 degrees, such that a part, which is transmitted through the first beam splitter 161, of the laser light having the wavelength may be sufficiently utilized.

As an example, the second beam splitter 162 may also be a long-wave pass dichroic mirror, which has a high reflectivity to laser light emitted from the laser 110 and having a predetermined wavelength and allows Raman scattering light generated after Raman scattering of the laser light and having a larger wavelength to be transmitted therethrough. The specific threshold of the long-wave pass dichroic mirror may be set as required (for example, based on a parameter such as the wavelength of the laser light emitted from the laser 110). In embodiments of the present disclosure, the second beam splitter 162 is not limited to the long-wave pass dichroic mirror, and the above function of the second beam splitter 162 may be achieved by selecting other known beam splitting arrangements.

With provision of the second beam splitter 162, the detection light path and the Raman light path may be at least partly combined, thereby facilitating reduction of the overall dimension of the detection apparatus.

In an embodiment, the optical devices may also include one or more other optical members, in addition to the first beam splitter 161 and the second beam splitter 162.

For example, as shown in FIG. 1, the detection apparatus 100 may further comprise a first optical filter 163 disposed in the Raman light path at a position downstream of the second beam splitter 162 and configured to filter Rayleigh light or other stray light from a light signal that has passed through the first beam splitter 161, thereby reducing interference of the Rayleigh light or other stray light to the Raman spectrometer. In an exemplary embodiment, the first optical filter 163 may include a long wave-pass filter or a notch filter.

In an embodiment, as shown in FIG. 1, the detection apparatus 100 may further include a second optical filter 164 disposed in the laser light path at a position upstream of the first beam splitter 161 (that is, between the laser 110 and the first beam splitter 161) and configured to limit the laser light emitted by the laser 110 within a desired wavelength band. In an exemplary embodiment, the second optical filter 164 may include a narrow band filter.

In an embodiment, as shown in FIG. 1, the detection apparatus 100 may further comprise a first convergent lens (or lens set) 166 disposed between the first beam splitter 161 and the object 120 to be detected, a second convergent lens (or lens set) 167 disposed between the light sensor 140 and the second beam splitter 162, and/or a third convergent lens (or lens set) 168 disposed between the Raman spectrometer 130 and the second beam splitter 162. The first convergent lens (or lens set) 166 may be used for collecting reflected and scattered light from the object, facilitating improvement of sensitivity and accuracy of detection of the light sensor 140 and the Raman spectrometer 130. The second convergent lens (or lens set) 167 may be used for converging light so as to increase the power received by the light sensor 140, thereby facilitating improvement of detection sensitivity of the light sensor 140. The third convergent lens (or lens set) 168 may be used for converging light such that more Raman scattered light enters the Raman spectrometer, thereby facilitating improvement of sensitivity and accuracy of detection of the detection apparatus 100.

It is noted that each of the above first to third convergent lenses or lens sets may include a single convex lens shown in FIG. 1, or may include a lens set having a plurality of lenses and having a light converging function.

According to an aspect of the present disclosure, there is provided a detection method using a Raman spectrometer.

Figure 2:
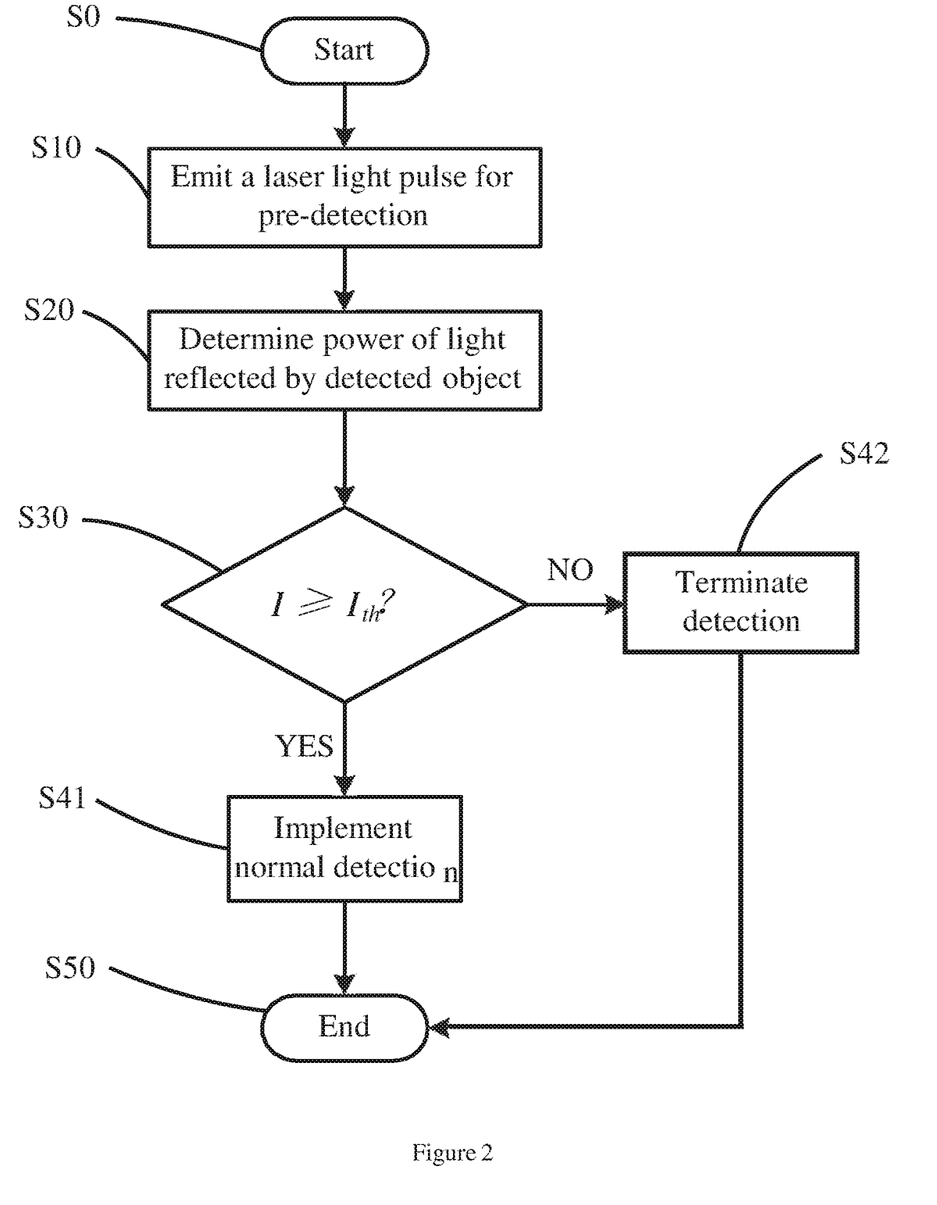
FIG. 2 is a flow chart schematically showing a detection method according to another embodiment of the present disclosure.

FIG. 2 is a flow chart schematically showing a detection method according to an embodiment of the present disclosure. As shown in FIG. 2, after starting a detection procedure (S0), the detection method may include following steps:

step S10: emitting a laser light pulse to an object 120 to be detected;

step S20: receiving reflected light and scattered light coming from the object 120 and generated by the laser light pulse, and determining power I of the reflected light and scattered light;

step S30: comparing the determined power I with a threshold power $I_{th}$;

step S41: implementing a normal detection if, for example, the power I is greater than or equal to the threshold power $I_{th}$; and step S42: terminating the detection if, for example, the power I is smaller than the threshold power $I_{th}$.

The detection procedure ends (S50) after the detection is finished or terminated.

In an exemplary embodiment, the above steps may be specifically implemented as follows.

In step S10, the laser 110 emits, towards the object 120 to be detected 120, a laser light pulse, for example, a laser light pulse having a duration time of about 5 milliseconds, for pre-detection.

In step S20, the power of light reflected and scattered by the object 120 under irradiation of the laser light pulse may be sensed or determined by the light sensor 140. As described above, the light sensor 140 may include a photodiode or similar photoelectric element.

In step S30, the determined power I is compared with the threshold power $I_{th}$ by the controller 150, or the determined power I may be sent by the controller 150 or the light sensor 140 to a nearby or remote device where it is compared with the threshold power $I_{th}$.

In step S41, if, e.g., the determined power I is greater than or equal to the threshold power $I_{th}$, it may be determined that the object 120 has a light color and is adapted to a laser light detection. In this case, the controller 150 may instruct the laser 110 to emit laser light for a normal detection, until the detection is finished.

In step S42, if, e.g., the determined power I is smaller than the threshold power $I_{th}$, it may be determined that the object 120 has a darker color and thus is not adapted to laser light detection. In this case, the controller 150 may instruct to terminate the detection, thereby the detection procedure ends.

In addition, the step S42 may further include instructing the alarm device 160 by the controller 150 to issue an alarm.

Figure 3:
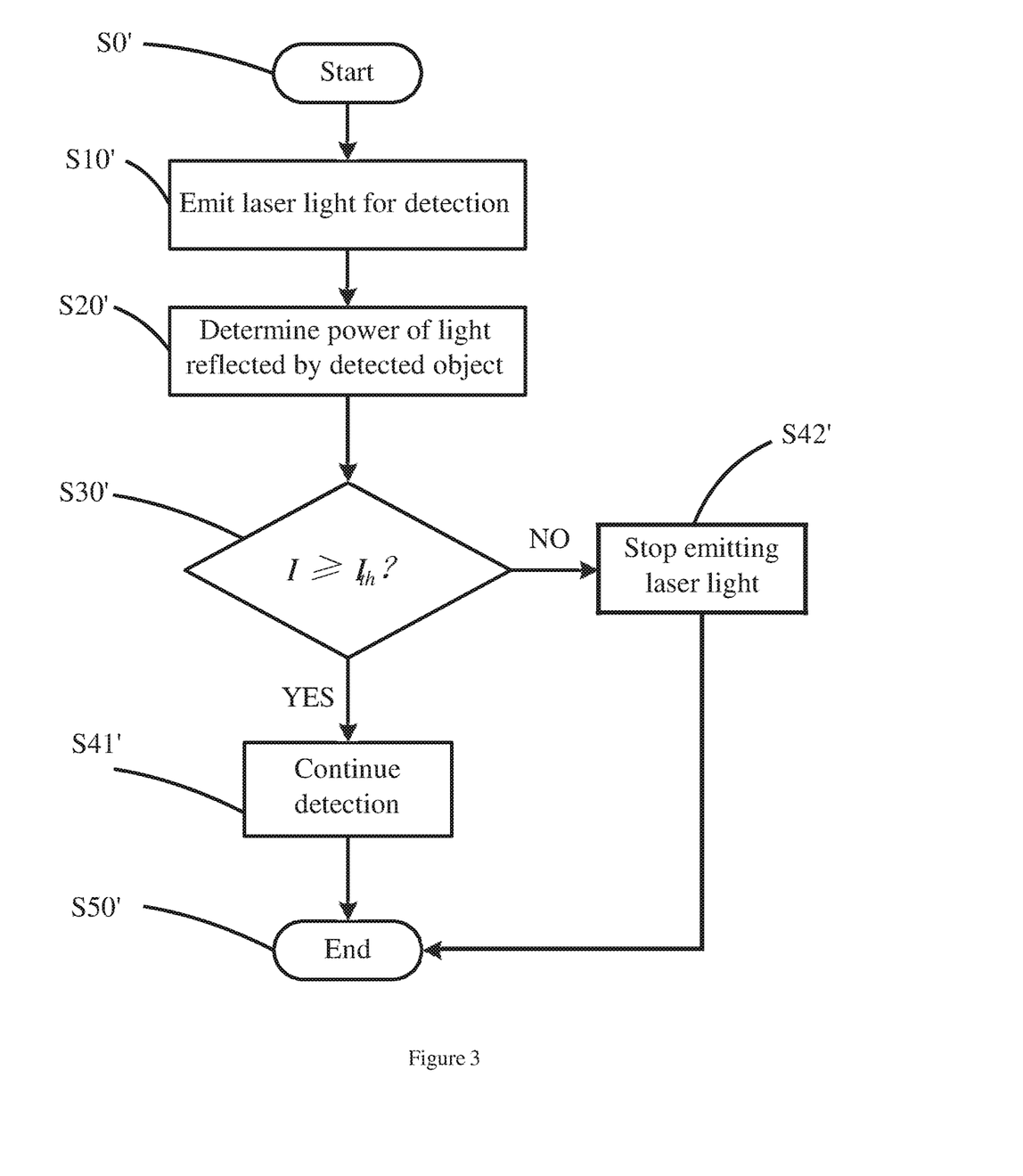
FIG. 3 is a flow chart schematically showing a detection method according to a further embodiment of the present disclosure.

FIG. 3 is a flow chart schematically showing a detection method according to a further embodiment of the present disclosure. As shown in FIG. 3, after starting a detection procedure (S0'), the detection method may include following steps:

step S10': emitting, towards an object 120 to be detected, laser light for detection;

step S20': receiving reflected and backward Rayleigh-scattered light coming from the object 120 and generated due to irradiation of the laser light, and determining power I of the reflected light and scattered light;

step S30': comparing the determined power I with a threshold power $I_{th}$;

step S41': implementing a normal detection if, e.g., the power I is greater than or equal to the threshold power $I_{th}$; and step S42': terminating the detection if, e.g., the power I is smaller than the threshold power $I_{th}$.

The detection procedure ends (S50') after the detection is finished or terminated.

In an exemplary embodiment, the above steps may be specifically implemented as follows.

In step S10', the laser 110 may emit, towards the object 120 be detected, a laser light beam for directly implementing a normal detection.

In step S20', the power of light reflected and scattered by the object 120 under irradiation of the laser light pulse may be sensed or determined by the light sensor 140. As described above, the light sensor 140 may include a photodiode or similar photoelectric element.

In step S30', the determined power I is compared with the threshold power $I_{th}$ by the controller 150, or the determined power I may be sent by the controller 150 or the light sensor 140 to a nearby or remote device where it is compared to the threshold power $I_{th}$.

In step S41', if, e.g., the determined power I is greater than or equal to the threshold power $I_{th}$, it may be determined that the object 120 has a light color and is adapted to a laser light detection. In this case, the controller 150 may instruct the laser 110 to emit laser light for a normal detection, until the detection is finished.

In step S42', if, e.g., the determined power I is smaller than the threshold power $I_{th}$, it may be determined that the object 120 has a darker color and thus is not suitable to laser light detection. In this case, the controller 150 may instruct to terminate the detection, thereby the detection procedure ends.

In addition, the step S42' may further include instructing the alarm device 160 by the controller 150 to issue an alarm.

The above description has explained various embodiments of the above Raman spectrum inspection apparatus and monitoring method thereof by schematic views, flow charts and/or examples. In case that the schematic views, flow charts and/or examples each include one or more functions and/or operations, the skilled person in the art should understand that each function and/or operation in such schematic views, flow charts and/or examples may be implemented separately and/or collectively by various structures, hardware, software, firmware or any combination of them in essential. In an embodiment, some parts of the subject of the embodiment of the present disclosure may be implemented by Application Specific Integrated Circuits (ASIC), Field Programmable Gate Arrays (FPGA), Digital Signal Processors (DSP) or other integrated forms. However, the skilled person in the art should understand that some aspects of the embodiments disclosed herein may be implemented equally in an integrated circuit entirely or partly, implemented as one or more computer programs running on one or more computers (for example, implemented as one or more programs running on one or more computer systems), implemented as one or more programs running on one or more processors (for example, implemented as one or more programs running on one or more microprocessors), implemented as firmware, or implemented as any combination of the above methods in essential. From the present disclosure, the skilled person in the art has capability of designing circuits and/or writing software and/or firmware codes.

Furthermore, the skilled person in the art will appreciate that the mechanism of the subject of the present disclosure may be delivered as various forms of program products, and the exemplified embodiments of the subject of the present disclosure may be applicable independent of the specific types of the signal carrying media that perform the delivery in practice. Examples of the signal carrying media include, but not limited to: recordable media, such as a floppy disc, a hard disk drive, an optical disc (CD, DVD), a digital magnetic tape, a computer memory or the like; and transmission media such as digital and/or analogue communication media (for example, an optical fiber cable, a wave guide, a wired communication link, a wireless communication link or the like).

Although exemplary embodiments of the present disclosure have been illustrated in the drawings, it will be understood by those skilled in the art that the present disclosure may be still implemented even if one or more unnecessary members/parts are omitted. Although several exemplary embodiments of the present disclosure have been described with reference to the drawings, it would be appreciated by those skilled in the art that modifications and variations may be made in these embodiments without departing from the principles and spirit of the general inventive concept of the present disclosure, the scope of which is defined in the appended claims and their equivalents.

What is claimed is:

1. A detection apparatus, comprising:
   a laser configured to emit laser light towards an object to be detected;
   a Raman spectrometer configured to receive a Raman light signal from the object;
   a light sensor configured to receive portions of the laser light reflected and scattered by the object under irradiation of the laser light, and to determine power of the received portions of the laser light; and
   a controller configured to determine a color shade or tint of the object based on the power and control an operation of the detection apparatus based on the determined color shade or tint.

2. The detection apparatus according to claim 1, wherein the controller is further configured to:
   compare the power determined by the light sensor with a threshold power;
   instruct the laser to emit the laser light for detection in response to the power crossing or equaling the threshold power; and
   instruct the detection apparatus to terminate the detection in response to the power not crossing or equaling the threshold power.

3. The detection apparatus according to claim 2, further comprising an alarm device, and the controller is further configured to instruct the alarm device to send an alarm signal while or after instructing the detection apparatus to terminate the detection.

4. The detection apparatus according to claim 2, wherein the detection apparatus further comprises a fixing device configured to position the object such that a surface to be detected of the object is essentially perpendicular to a direction along which the laser light impinges onto the surface.

5. The detection apparatus according to claim 4, wherein the fixing device comprises:
   a light aperture, through which the laser light passes to impinge onto the surface to be detected of the object; and
   an inner positioning surface arranged to be essentially perpendicular to a direction along which the laser light passes through the light aperture,
   wherein the surface to be detected of the object is arranged to abut against the inner positioning surface.

6. The detection apparatus according to claim 2, wherein the detection apparatus further comprises a first beam splitter disposed in a Raman light path between the object and the Raman spectrometer, the first beam splitter configured to guide the laser light emitted from the laser to the object, to transmit the Raman light from the object through the first beam splitter to the Raman spectrometer, and to have a predefined transmittance to laser light, emitted by the laser, having a predetermined wavelength.

7. The detection apparatus according to claim 6, wherein the detection apparatus further comprises a second beam splitter disposed in the Raman light path between the object and the Raman spectrometer, the second beam splitter configured to reflect reflected laser light and scattered laser light from the object, to transmit the Raman light from the object through the second beam splitter to the Raman spectrometer, and to reflect a part, which is transmitted through the first beam splitter, of the laser light having the predetermined wavelength, to the light sensor.

8. The detection apparatus according to claim 1, wherein the detection apparatus further comprises a fixing device configured to position the object such that a surface to be detected of the object is essentially perpendicular to a direction along which the laser light impinges onto the surface.

9. The detection apparatus according to claim 8, wherein the fixing device comprises:

a light aperture through which the laser light passes to impinge onto the surface to be detected of the object; and an inner positioning surface arranged to be essentially perpendicular to a direction along which the laser light passes through the light aperture, wherein the surface to be detected of the object is arranged to abut against the inner positioning surface.

10. The detection apparatus according to claim 1, wherein the detection apparatus further comprises a first beam splitter disposed in a Raman light path between the object and the Raman spectrometer, the first beam splitter configured to guide the laser light emitted from the laser to the object, to transmit the Raman light from the object through the first beam splitter to the Raman spectrometer, and to have a predefined transmittance to laser light, emitted by the laser, having a predetermined wavelength.

11. The detection apparatus according to claim 10, wherein the detection apparatus further comprises a second beam splitter disposed in the Raman light path between the object and the Raman spectrometer, the second beam splitter configured to reflect reflected laser light and scattered laser light from the object, to transmit the Raman light from the object through the second beam splitter to the Raman spectrometer, and to reflect a part, which is transmitted through the first beam splitter, of the laser light having the predetermined wavelength, to the light sensor.

12. The detection apparatus according to claim 10, wherein the detection apparatus further comprises at least one of following optical members:

a first optical filter disposed in the Raman light path at a position downstream of the first beam splitter, and configured to filter Rayleigh light of a light signal; or a second optical filter disposed between the laser and the first beam splitter and configured to limit the laser light emitted by the laser within a desired wavelength band.

13. The detection apparatus according to claim 10, wherein the detection apparatus further comprises at least one of following optical members:

a first convergent lens or lens set disposed between the first beam splitter and the object;

a second convergent lens or lens set disposed between the light sensor and a second beam splitter; or a third convergent lens or lens set disposed between the Raman spectrometer and a second beam splitter.

14. The detection apparatus according to claim 10, wherein the predefined transmittance of the first beam splitter with respect to laser light impinging at an incident angle of 45 degrees is selected from a range from 5% to 30%.

15. A detection method using the detection apparatus of claim 1, the method comprising:

emitting, to the object to be detected, a laser light pulse for pre-detection;

receiving reflected laser light and scattered laser light coming from the object and generated under the laser light pulse, and determining the power of the reflected and scattered laser light;

comparing the determined power with a threshold power so as to determine a color shade or tint of the object;

performing a normal detection responsive to the determined power crossing or equaling the threshold power; and terminating the detection responsive to the determined power not crossing or equaling the threshold power.

16. The method according to claim 15, wherein the laser light pulse for pre-detection has a duration time of about 5 milliseconds.

17. The method according to claim 15, further comprising sending an alarm signal while or after terminating the detection.

18. A detection method using the detection apparatus of claim 1, the method comprising:

emitting, to the object to be detected, a laser light for detection;

determining the power of the laser light reflected and scattered by the object;

comparing the determined power with a threshold power so as to determine a color shade or tint of the object;

continuing the detection responsive to the determined power crossing or equaling the threshold power; and terminating the detection responsive to the determined power not crossing or equaling the threshold power.

19. The method according to claim 18, further comprising sending an alarm signal while or after terminating the detection.

* * * * *